United States Patent [19]

Wood et al.

[11] Patent Number: 4,779,642

[45] Date of Patent: Oct. 25, 1988

[54] BACK PRESSURE REGULATOR AND VALVE SYSTEM

[75] Inventors: Coleman Wood, 2236 Colquitt, Houston, Tex. 77098; Clarence W. Carpenter, Houston, Tex.

[73] Assignee: Coleman Wood, Haus Co., Tex.

[21] Appl. No.: 101,682

[22] Filed: Sep. 28, 1987

[51] Int. Cl.⁴ .................................. G05D 16/00
[52] U.S. Cl. ..................... 137/487.5; 137/624.13; 251/122
[58] Field of Search ............... 137/487.5, 624.13, 486, 137/624.15; 251/122

[56] References Cited

U.S. PATENT DOCUMENTS

| | | | |
|---|---|---|---|
| 2,917,271 | 12/1959 | Banks | 251/122 |
| 3,077,552 | 2/1963 | Koppel | 137/487.5 X |
| 3,464,438 | 9/1969 | Maurer | 137/487.5 |
| 3,586,027 | 6/1971 | Fitzgerald | 251/122 |
| 4,476,893 | 10/1984 | Schwelm | 137/487.5 X |
| 4,679,591 | 7/1987 | Mane | 137/624.13 |
| 4,705,067 | 11/1987 | Coffee | 137/487.5 |

Primary Examiner—Alan Cohan
Attorney, Agent, or Firm—Gunn, Lee & Jackson

[57] ABSTRACT

A back pressure regulator system is set forth. In the preferred embodiment, a pressure to be regulated is input to a pressure transducer. The transducer forms a signal indicative of pressure applied through a regulator system which forms an output driving differential signal suitable for a motor. An electric motor is driven thereby and operates a gear box which in turn connects through a slip clutch and a linear motion clutch to advance or retract a needle valve stem. The stem is threadedly engaged with the body. It rotates to advance or retract a needle valve in a valve seat, and a connection is made from the pressure to be regulated through the needle valve to thereby control back presssure on the system.

32 Claims, 3 Drawing Sheets

BACK PRESSURE REGULATOR AND VALVE SYSTEM

BACKGROUND OF THE DISCLOSURE

The present apparatus relates to a back pressure regulator particularly intended for use in multi-phase systems. By that, reference is made to a system which may have a mixed flow of gas in solution, water and materials which are not soluble in the water. In one particular example as many as three phases in the sample product can be mixed or the mix can be any two of the three phases. This makes back pressure regulation difficult to implement because the mixed phases each have different viscosities. For the back pressure to remain constant the valve must have a different opening for each phase dependent on the viscosity of the phases in question. It is therefore common to achieve a stable setting for one phase. In laboratory circumstances, it is very important to have available a system which can regulate the sample back pressure in a multiple phase flow. The present apparatus is such a system which particularly helps in the operation of laboratory procedures where pressure fluctuation in a dynamic circumstance may be highly undesirable. The present apparatus certainly provides that kind of regulation, overcoming fluctuations in system pressure, and also responds even to wide ranges of viscosity and/or pressure changes or pressure settings for single phase or multiple phase fluids. The present apparatus is constructed and arranged with a selected back pressure permitted in the system. Moreover, this apparatus can control flow rates which are quite small. The present apparatus also has the advantage of achieving relative high speed resetting in flow rate to assure that the back pressure is regulated. As will be understood, the speed of response can be optimized at an intermediate rate, meaning resetting is not too fast or too slow.

One of the features of the present apparatus is the use of a pressure sensor which observes the pressure in a storage system.

The storage system is pressured to and held at a desired operating level for the system being controlled. The transducer voltage for the storage is set as a reference voltage for the system. The storage system is charged with a dry inert gas, which will not become liquid at the operating pressure, preferably nitrogen. When this charging gas is placed in that portion of the equipment, the equipment is protected by gas isolation from the fluid which is actually being regulated. The fluid undergoing regulation is likely to be chemically active and can vary widely from a high measure of activity to inert condition. In any case, the fluid in question is regulated without impinging on the pressure transducer. Thus, the pressure transducer is isolated from the valving system. This is desirable because it protects a significant portion of the system from impingement with active chemicals and it provides a damping action on the rate at which pressure changes in the fluid system are transmitted to the transducer. The present apparatus is described in very general terms as an isolated pressure sensor system which is adjustable to a set level. Further, it includes a metering valve with a movable stem. Maximum control will be achieved using a long, tapered stem. The stem can be threaded so that a motor can drive the stem in both directions to advance and retract the stem, or a linear drive system can move the stem. The preferred system also includes means for installing a seat cooperative with a needle valve to control metered flow, the flow route having an inlet and vent to waste, collection or atmosphere. The needle valve and valve seat cooperative therewith provide the throttling function. In the event that a change of phase is experienced at the needle valve, this change may reflect up the system, thereby creating a pressure change. When a pressure change occurs, it is converted by the pressure transducer into a signal which is compared to the reference voltage and then is relayed to a motor, the motor being provided with a proper polarity signal, all for the purpose of driving the motor and readjusting the needle valve. The motor dynamically moves the needle valve so that setting and resetting is accomplished continuously to assure that system pressure is regulated. This also successfully operates even when a change of phase is observed at the needle valve because the needle valve has a very small volume which results in rapid reaction to signal changes.

DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
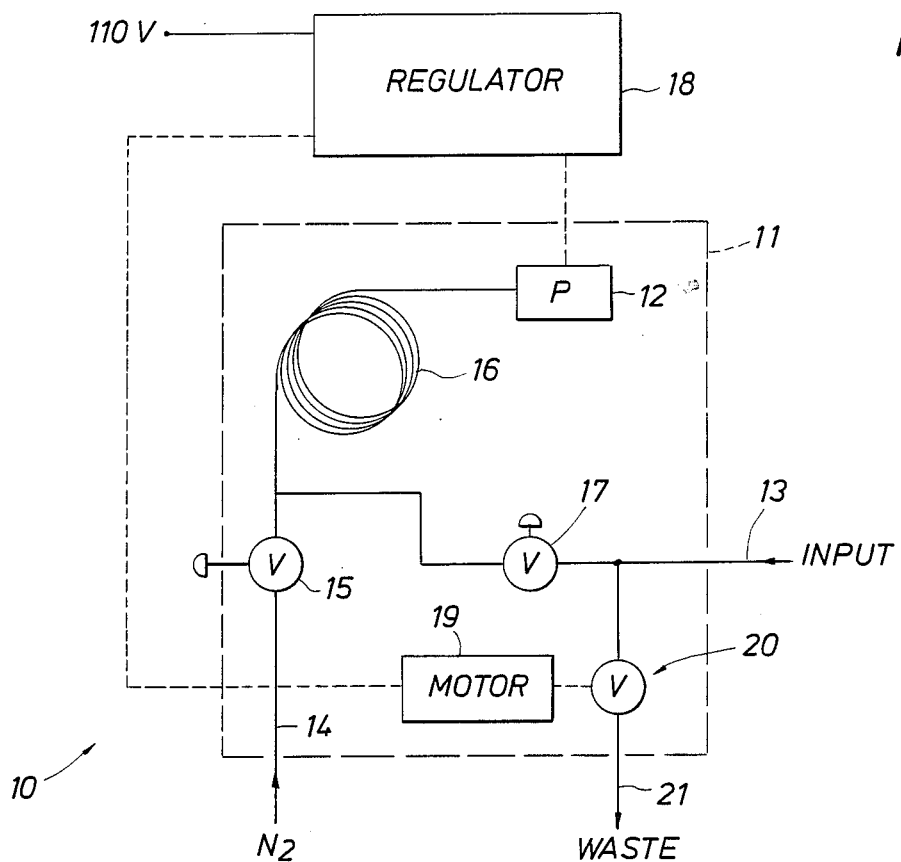
FIG. 1 is a schematic system flow chart for the back pressure regulator of the present apparatus including a pressure transducer cooperative with a metering needle valve.

Attention is first directed to FIG. 1 of the drawings where the numeral 10 identifies the entire system, namely a system which includes a controlled needle valve which functions as a back pressure regulator and also shows the transducer and motor drive system. The present apparatus is intended to be installed for dynamic monitoring and operation with a pressurized system susceptible to multi-phase flow, and the system further includes a regulator which determines a particular pressure which is input to the system. The transducer continuously monitors pressure. In FIG. 1 of the drawings, the numeral 11 identifies a cabinet or housing which supports the present apparatus. The cabinet is shown with certain components on the interior for ease of installation. An important device is a pressure transducer 12. It is connected with an inlet 13. The pressure to be regulated is on the line 13. Back pressure reflected into the line 13 is thus controlled by the present apparatus. The pressure on the line 13 is determined by the reference setting established by the gas injected into the storage 16.

The system operates with a suitable supply of dry nitrogen. The nitrogen inlet 14 connects through a regulator valve 15 which is adjustable to some desired pressure. In turn, the nitrogen fills a coiled line 16 to a selected pressure. An alternate apparatus which can be used instead of the coil line 16 is a pressure accumulator of a specified volume to provide desired system damping. Briefly, the regulator 15 is set to a desired pressure. When that pressure is observed at the transducer 12, a particular output signal is formed. The output signal is keyed to the particular pressure achieved in the system by setting the valve setting 15. Sharp variations in pressure are damped by the incorporation of the coiled pipe 16. Thus, a shock wave propagating through the column of compressible fluid is in some measure damped so that it does not impinge directly on the pressure transducer 12. Once a particular pressure has been achieved and set into the regulator 18 as a system reference voltage, the pressure transducer 12 will continually monitor operation to assure that the back pressure is maintained at this level or setting.

The lines which are on the interior of the equipment are filled with nitrogen. Nitrogen is permitted to flow to the valve 17. It is preferably a simple plug valve which is either opened or closed. The valve 15 is closed. When valve 17 is opened, it communicates the pressure from the line 13 to the transducer 12. At that juncture, fluctuations in the pressure at the input 13 are then observed at the transducer 12. The present apparatus particularly includes the needle valve 20 of the present disclosure. It is connected directly to the input line 13 and vents to atmosphere through a vent line 21. The rate at which the fluid is vented assists in maintaining back pressure. Thus, if back pressure rises, the valve 20 is opened further. When it is open, flow is vented at a greater rate and therefore the back pressure tends to be regulated. Actual regulation is accomplished by means of a regulator system 18 which is connected with a drive motor 19 which operates the needle valve 20. These connections are shown in symbolic fashion in FIG. 1 of the drawings.

Figure 2:
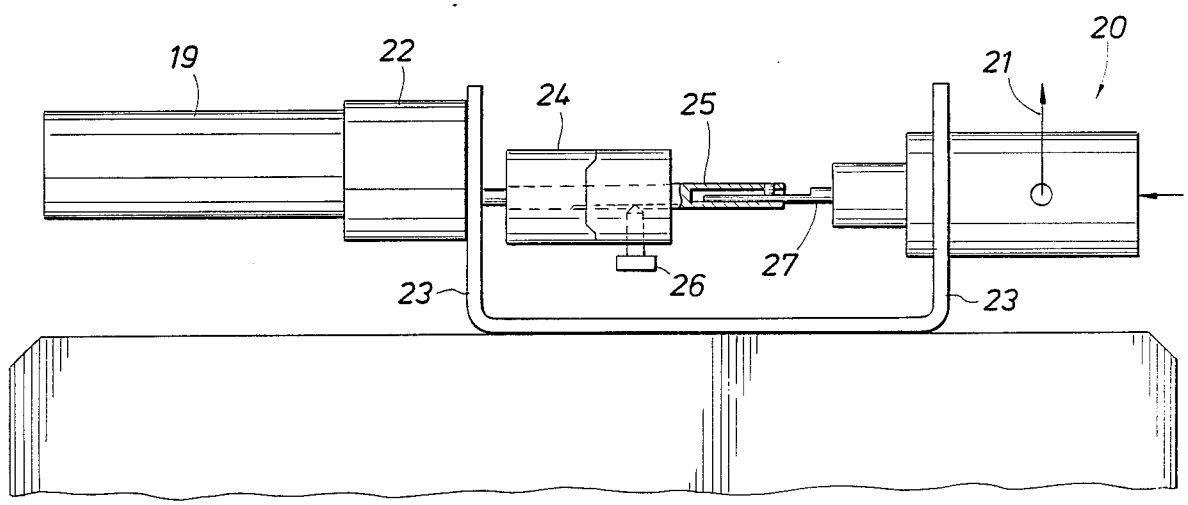
FIG. 2 is a side view of a needle valve including a rotatable stem, motor and intermediate gear box with clutch for driving the needle valve.

In FIG. 2 of the drawings the numeral 19 again identifies the motor. It is directly connected with a suitable gear box 22 mounted on an upstanding bracket 23. The gear box provides a proper gear ratio for operation, and the output thereof is through a clutch 24 which permits slippage in the event the needle valve is completely closed. The clutch 24 permits slippage in rotation. Separate from that, there is a linear clutch having a hollow, slotted, cylindrical housing 25. A set screw 26 protrudes to the slot thereof. The screw limits rotation. The housing is joined by a set screw to the shaft 27. The shaft is round except that a flat is cut on the upper face thereof, and the set screw protrudes into the region where the flat of the shaft 27 is located. The housing 25 in turn slides into the hollow clutch 24 where the pointed guide screw 26 engages the conforming slot or groove along the housing to sufficient depth to prevent rotation but still allow telescoping of the housing. In other words, the housing 25 is able to telescope in and out. However, even when it telescopes, rotation is still transferred because the screw 16 permits sliding movement while locking the two units to rotate together. When rotation is delivered to the shaft 27, it is imparted to the needle valve structure as will be discussed with other drawings. The needle valve 20 is supported by the common mounting bracket 23.

Figure 3:
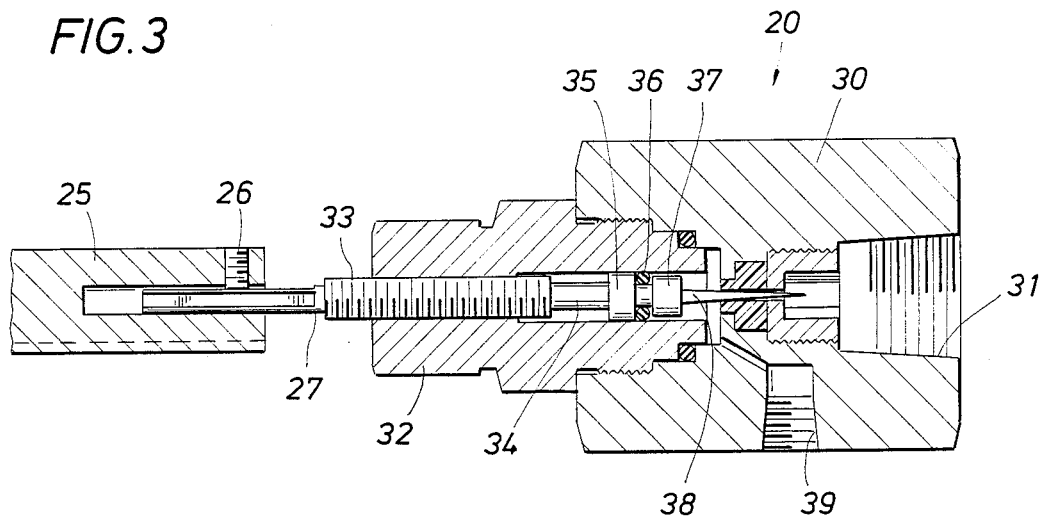
FIG. 3 is a sectional view through a preferred embodiment of the needle valve of FIG. 2 showing details of construction of the needle valve whereby multiple phase fluids can be handled.

Attention is next directed to FIG. 3 of the drawings where additional details are shown. There, the shaft 27 is again illustrated. It fits inside of the sleeve 25 and telescoping movement is permitted while rotation is transmitted between the two. The valve 20 incorporates a valve body 30 which is axially drilled with a tapped opening at 31. The opposite end of the body is countersunk with appropriate aligned stepped passages so that a plug 32 is threaded into the opposite end of the body. The plug 32 threads to a stem 33 which is rotated to advance or retract. It may also be driven in and out by a linear motion drive mechanism such as a linear drive stepper or Saginaw drive. In this case, the stem 33 and plug 32 would be a slip fit without threads. When this occurs, it moves the stem 34. The stem 34 supports an enlargement 35 adjacent to an O-ring groove 36. Another enlargement 37 defines the head of the needle valve assembly. The needle valve element terminates at the pointed needle 38 which extends well beyond the end of the structure. The axial passage which receives the threadedly advanced stem aligns it with the valve seat as will be described with other views. Briefly, fluid is introduced through a conduit at the tapped opening 31. It flows to the interior and is metered through the valve seat and flows out through an exhaust or vent port 39. The port 39 is connected by means of a small passage to complete the vent passage.

Figure 4:
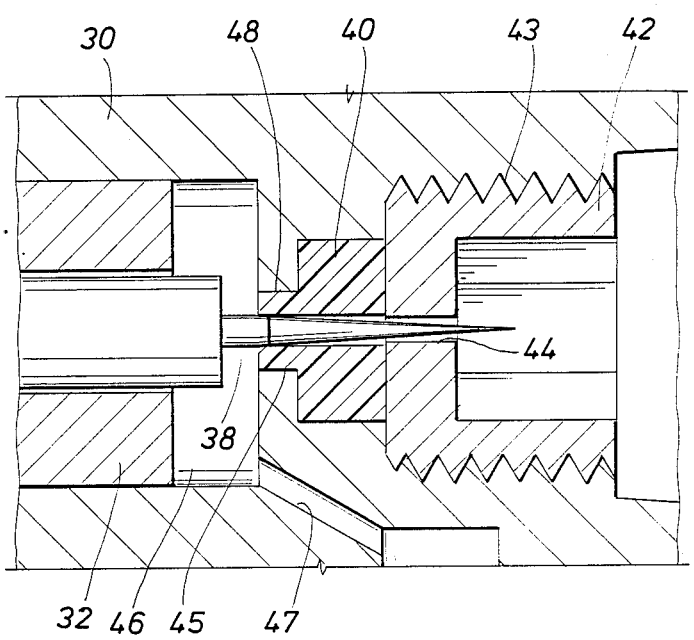
FIG. 4 is an enlarged detail view of the preferred needle valve with seat previously described in FIG. 3 of the drawings.

Attention is directed to FIG. 4 of the drawings which is an enlarged detail view. Normal metering valves have a long tapering metal needle which enters a metal seat or small orifice with flow control provided by the annulus formed between the seat and tapered needle. If the two surfaces are forcibly engaged, they frequently lock together to destroy the valve action. The preferred design used here with the resilient seat prevents jamming of the needle in the seat to prolong valve life and also permits valve closure without valve damage, a problem common to metal metering valves. A preferred design with a resilient valve seat member 40 is captured in a countersunk passage. It incorporates an upstanding cylindrical integrally cast portion 48 which surrounds the needle 38. It is held in position by a hollow spool 42. The spool is axially hollow having an internal configuration for receiving an Allen wrench so that it may be threaded at 43 to the body 30. It is drilled with a central hole 44 to enable flow through the valve. The spool 42 captures the resilient plug 40 in location. The plug 40 serves as the valve seat for the valve element 38. The near face of the valve seat 40 is positioned adjacent to a small drilled hole 45 which enables the needle 38 to contact directly against the resilient plug 40 which functions as a valve seat. The resilient plug 40 incorporates an upstanding cylindrical integrally cast portion which surrounds the needle 38. This particularly cooperates with the equipment to assure protection of the resilient valve seat member 40. This portion 48 provides a greater contact area against the needle 38 and therefore extends the life of the valve seat 40. The entire region has a circular cavity 46 which communicates with a small passage 47 connected with the port 39.

The arrangement of the components in FIG. 4 achieves throttling of the fluid which enters at the right side of the view and flows along the needle. The flow is controlled by the position of the needle 38 in the valve seat 40. This arrangement of needle and seat provides a controllable back pressure in the system whereby regulation during change of phase is far less difficult than would ordinarily occur. This permits rather precise or careful positioning of the needle to achieve throttling. Because of the soft seat, it can even permit complete shut off of flow without damage to the needle or seat. The flow is throttled and thereby assures proper regulation in conjunction with the remainder of the apparatus to be described.

Figure 5:
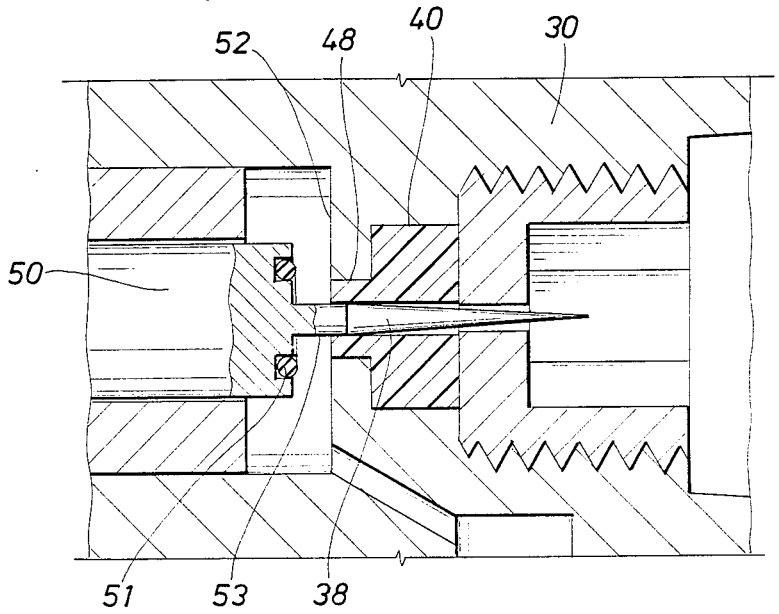
FIG. 5 is another alternate embodiment of the preferred needle valve including a seal ring if the valve closes completely.

Attention is now directed to FIG. 5 of the drawings which shows another embodiment of the needle valve. In this view, the resilient seat 40 again is incorporated with the upstanding central portion 48. The needle 38 is again illustrated. In this instance, it is attached to a stem construction 50 which includes an enlargement supporting a groove for receiving an O-ring 51 on the face. Both the cavity formed within the valve body 30 and the stem 50 may include a tapered face tapered at an angle to enhance contact against the O-ring 51. The O-ring 51 seals on the facing surface surrounding the drilled hole 45. The O-ring construction permits the needle valve to be threaded completely into the body 30 until complete closure is accomplished. The needle 38 terminates at a neck 53 which is cylindrical in shape and sized to fit within the valve seat 48 with sufficient swaging action on the seat to provide shut off without jamming. The needle 38 in the preferred embodiment tapers to a diameter slightly larger than the hole in the seat. As an example of an acceptable size, assume the hole is about 0.031" in diameter while the needle tapers to a maximum diameter slightly larger, say 0.038. The needle then becomes uniform in size for perhaps about 0.020" at a minimum. This permits the needle to enter the resilient material seat without undue distortion. Ideally, the resilient seat material is slick and able to be swaged by the needle, gripping without seizure. The needle hole (orifice), and motor drive system are chosen to provide optimum operation for the system being controlled.

Figure 6:
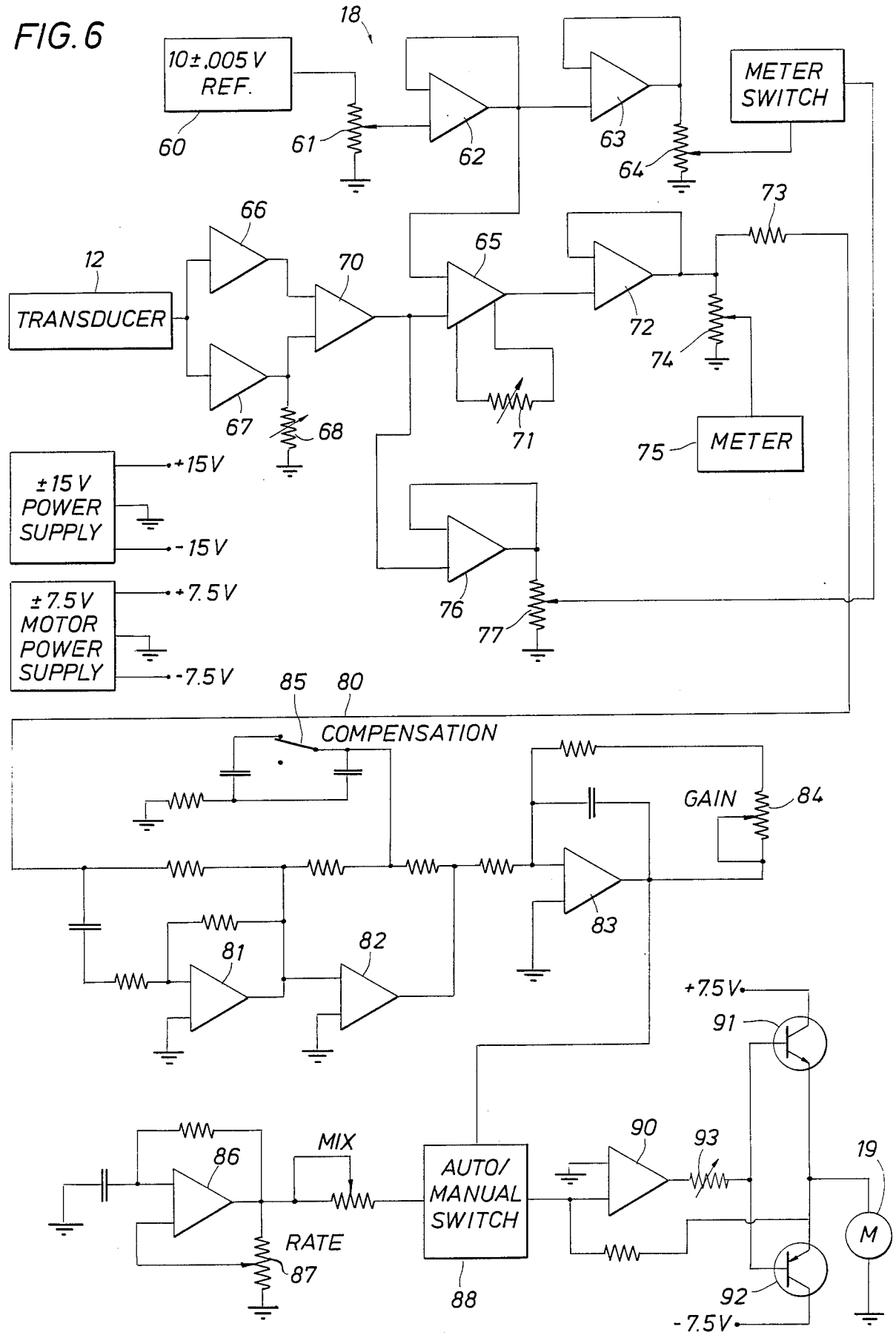
FIG. 6 is a system schematic of the regulator including a pressure transducer for providing a motor signal to change the reference setting of the needle valve.

Going now to FIG. 6 of the drawings, the regulator 18 is indicated in detail. Briefly, this system incorporates a control apparatus for driving the motor to assure proper operation. The regulator control system includes a reference voltage source 60 at the upper left corner. It is connected with an adjustable resistor 61 to enable a voltage to be obtained as a reference or set point. The voltage source is preferably 10±0.005 volts and the resistor is adjusted to provide a precise input voltage. This stable reference voltage is fed to an amplifier 62 for gain and isolation which in turn connects to a display output span adjustment amplifier 63 operating in conjunction with an adjustable resistor 64 for calibration. The outputs of the system are sent to a meter switch to enable monitoring and adjustment of the end point values for the regulator. In other words, the regulator must work with selectable end points (reference pressure, differential pressure and system pressure) and has an adjustable scale factor which permits control from the regulator so that a desired sensitivity and setting for the needle valve can be obtained.

The foregoing apparatus forms a setting which is input to a differential amplifier 65. The differential amplifier 65 is provided with a signal from the transducer 12. This signal is output through an amplifier 66, and there is an additional parallel amplifier 67 connected with adjustable resistor to ground. The resistor 68 provides a zero adjustment. The amplifiers provide differential voltages to another amplifier 70 which in turn forms an input to the differential amplifier 65. It is balanced with an adjustable resistor 71. The output is then provided to amplifier 72 which in turn provides an output signal through a resistor 73 for the motor control circuitry. The output is also delivered to an adjustable resistor 74 and then to a meter 75. The meter 75 serves as an indicator which forms a meter movement indicative of pressure. The meter can be calibrated in pressure. The system further includes an amplifier 76 providing an output to an adjustable resistor 77 which functions as a system span adjustment. This is again provided with an input from the meter switch previously mentioned.

As described at this juncture, the several amplifiers and adjustable resistors compare the transducer output signal with a reference, form a differential signal, and deliver that differential signal for operation of the motor as will be described.

The numeral 80 identifies the conductor which delivers the differential signal. If this signal is zero, there is no need for the motor to operate. On the other hand, if it is something indicative of a pressure signal, the motor is driven in one direction or the other dependent on the polarity. The conductor 80 is input to a common mode rejection amplifier 81. The output is provided to a compensation amplifier 82 and in turn to an amplifier 83 which is provided with an adjustable gain by means of a resistor 84. The system also includes a switch 85 which can be switched to thereby change the compensation. An amplifier 86 is connected with a suitable feedback loop to cause oscillation. The frequency is adjustable by means of the resistor 87. That oscillating output is delivered to a switch 88 which determines operation of the motor. The oscillator signal is mixed to a greater or lesser extent with the pressure signal developed previously. The switch can selectively deliver the signal derived from the conductor 80 so that feedback is completed for the motor. In other words, in the automatic mode nulling is achieved whereby the signal on the conductor 80 provides a driving signal and the system operates to reduce this to a null. The switch 88 is input to a power amplifier 90. The amplifier 90 operates through a variable resistor 93 to drive push/pull output transistors 91 and 92 which in turn power the electric motor 19. The resistor 93 controls the absolute speed of the motor 19.

Operation of the present apparatus should be considered. Assume that the equipment has not been switched on but has been connected with a suitable input line 13 which is at the desired operating pressure and also to a supply of nitrogen gas input at 14 and all valves are closed. The first step is to open the valve 15 and inject gas to the pressure level desired for operation. Once this is accomplished, the valve 15 is closed and the valve 17 is then opened. When it opens, the variable pressure to be regulated on the line 13 is in communication with the transducer 12. The regulator 18 responds to the pressure at the transducer 12. It then operates the motor 19 to vary the valve 20 and thereby achieve back pressure regulation. This is accomplished by forming a differential driving signal which is delivered in such a fashion to the motor 19 that the motor rotates, changing the setting of the needle valve. If the pressure on the line 13 is exessively high, then the valve 20 is opened until the pressure on the line 13 drops to the preset pressure. This requires operation of the motor 19 which is connected to the regulator 18.

The regulator system shown in FIG. 7 of the drawings includes adjustments in oscillating rate, gain, capacitance and motor speed to the motor so that the sensitivity of the system can be adjusted to give the least pulsation in the back pressure for a given set of system conditions. In any event, the differential driving signal on the conductor 80 is delivered for subsequent amplification and is provided to the motor 19 after amplification. This drives the motor in the proper direction to achieve readjustment of the needle valve.

As will be recalled, FIGS. 4 and 5 show slightly different constructions of the needle valve. In general, all the embodiments operate in similar regards, namely, the needle 38 is advanced into the valve seat made of resilient material. The flow is along the needle from the point. Flow is throttled by operation of the needle in the valve seat. This throttling effect assures that the needle is able to move back and forth in the valve seat. At the time that a phase change in fluid flow is observed, there may be a change in back pressure as a result of fluid viscosity. This however is reflected back into the system and is observed by the transducer 12, converted into a signal on the conductor 80 and the needle valve is readjusted in location. When readjustment occurs, the readjustment changes the position of the needle valve in the seat so that regulated pressure is achieved. The rate of change is adjustable by changing the scale factors particularly in the regulator 18. This change is thus implemented by adjustment of the setting of the needle valve and pressure regulation then continues even while the valve is changing positions.

One important feature is that the needle continuously hunts or moves slightly. This assists the regulator in rapidly reaching an optimal valve position and also frees any trash in the flow area to prevent clogging.

While the foregoing is directed to the preferred embodiment, the scope is determined by the claims which follow.

What is claimed is:

1. A back pressure regulator system which comprises:
   (a) a pressure transducer exposed to a pressure in a line to be regulated, said transducer forming an output signal wherein the output signal represents the pressure to be regulated;
   (b) needle valve means having:
      (1) a valve seat having an axial passage therethrough;
      (2) a needle valve extending into said valve seat;
      (3) a stem supporting said needle valve to advance into or retract from said valve seat;
   (c) motor means operative in two directions;
   (d) regulator means connected to said transducer for converting the signal provided thereby into a motor driving signal for driving said motor in one direction or the other for rotation of the needle valve to thereby adjust the position of the needle valve in said valve seat;
   (e) passage means connecting with the pressure in a line to be regulated and inputting such pressure to said needle valve for flow in regulated fashion therethrough wherein back pressure upstream in the line from said needle valve means is controlled by movement of said needle valve; and
   (f) wherein said motor means connects to said stem through a rotating clutch permitting slippage and also through a linear clutch permitting lengthwise movement wherein said stem is driven by rotation of said motor means.

2. The apparatus of claim 1 wherein said motor means connects to a gear box connected to said rotating clutch.

3. The apparatus of claim 2 including a valve body for said needle valve means, said body having an internally threaded hole receiving said stem therein for threaded movement.

4. The apparatus of claim 3 including an aligned valve seat mounting means receiving said valve seat thereat, said mounting means further aligning said needle valve for movement into said valve seat.

5. The apparatus of claim 3 including a threaded inlet into said valve body for connection to the pressure in a line to be regulated, and also having an outlet passage from said valve seat for voiding flow from said threaded inlet.

6. The apparatus of claim 5 including a second valve seat axially downstream of said valve seat, and also including a seal means on said valve stem for sealing to said second valve seat to completely prevent fluid flow.

7. The apparatus of claim 6 wherein said valve stem includes an enlarged shoulder area having a recessed circular area for receiving and retaining said seal means therein.

8. The apparatus of claim 7 wherein said second valve seat provides complete shut off and said first valve seat cooperative with said needle valve provides modulated flow.

9. The apparatus of claim 8 wherein said system includes:
   (a) a regulated supply of dry gas supplied to said transducer;
   (b) switch valve means connecting pressure in the line to be regulated to said transducer wherein dry gas impinges on said transducer;
   (c) a pressure accumulator upstream of said transducer to reduce pressure variations at said transducer; and
   (d) an inlet port adapted to connect to the pressure in a line to be regulated, said port being connected to
      (1) said switch valve means; and
      (2) said needle valve means.

10. The apparatus of claim 9 wherein said regulator means includes:
    (a) comparator means provided with two signals,
       (1) one from said transducer means indicative of measured pressure; and
       (2) one from an adjustable reference; and
    (b) difference dependent circuit means connected to said comparator means for forming a motor means driving signal having amplitude and polarity such that said motor means is driven to reduce the difference.

11. The apparatus of claim 10 wherein said difference dependent circuit means includes adjustable gain control means to vary the speed of response of said motor means.

12. The apparatus of claim 10 wherein said difference dependent circuit means includes adjustable voltage control means to vary the rotational speed of the said motor means.

13. The apparatus of claim 10 wherein said motor means is connected to an amplifier providing a driving signal thereto under control of said difference dependent circuit means.

14. The apparatus of claim 1 wherein said motor means connects to a linear motion drive means which connects to said stem wherein said stem is driven lengthwise by rotation of said motor means.

15. The apparatus of claim 1 wherein said motor means is a linear stepping motor means connected to said stem wherein said stem is driven lengthwise by rotation of said motor means.

16. The apparatus of claim 1 wherein said regulator means includes:
   (a) comparator means provided with two signals,
      (1) one from said transducer means indicative of measured pressure; and
      (2) one from an adjustable reference; and
   (b) difference dependent circuit means connected to said comparator means for forming a motor means driving signal having amplitude and polarity such that said motor means is driven to reduce the difference.

17. The apparatus of claim 16 wherein said difference dependent circuit means includes adjustable gain control means to vary the speed of response of said motor means.

18. The apparatus of claim 17 wherein said motor means is connected to an amplifier providing a driving signal thereto under control of said difference dependent circuit means.

19. The apparatus of claim 18 including switch means overriding said difference dependent circuit means to enable operation of said motor means at a controlled rate to achieve initial positioning of said needle valve means.

20. The apparatus of claim 19 including manual rate control for said motor means.

21. The apparatus of claim 20 wherein said regulator includes an oscillator connected to said motor means to cause hunting thereby.

22. The apparatus of claim 1 wherein said seat material is resilient and deforms to surround said needle valve for closure, and further including shoulder means limiting said needle valve entry into said seat.

23. The apparatus of claim 1 wherein said transducer forms a signal compared to a reference signal and a comparison yields a control signal for operation of said regulator means.

24. A back pressure regulator system which comprises:
   (a) a pressure transducer including dampening means exposed to a pressure in a line to be regulated, said transducer forming an output signal wherein the output signal represents the pressure to be regulated;
   (b) needle valve means having:
      (1) a valve seat of resilient material having an axial passage therethrough;
      (2) a needle valve extending into said valve seat;
      (3) a stem supporting said needle valve to advance fully into or retract from said valve seat to enable complete closure;
   (c) motor means operative in two directions;
   (d) regulator means connected to said transducer for converting the signal provided thereby into a motor means driving signal for operating said motor means in one direction or the other for rotation of the needle valve to thereby adjust the position of the needle valve in said valve seat and wherein motor means motion creates oscillatory motion during opening or closing at said needle valve to clear bubbles from said valve seat; and
   (e) passage means connecting with the pressure in a line to be regulated and inputting such pressure to said needle valve for damped and in regulated flow therethrough wherein back pressure upstream in the line from said needle valve means is controlled by movement of said needle valve.

25. The apparatus of claim 24 wherein said regulator means includes:
   (a) comparator means provided with two signals,
      (1) one from said transducer means indicative of measured pressure; and
      (2) one from an adjustable reference; and
   (b) difference dependent circuit means connected to said comparator means for forming said motor means driving signal such that said motor means is driven to reduce the difference.

26. The apparatus of claim 25 wherein said difference dependent circuit means includes adjustable gain control means to vary the speed of response of said motor means.

27. The apparatus of claim 25 wherein said difference dependent circuit means includes adjustable voltage control means to vary the speed of the said motor means.

28. The apparatus of claim 24 wherein said motor means connects to a linear motion drive means which connects to said stem wherein said stem is driven lengthwise by rotation of said motor means.

29. The apparatus of claim 24 wherein said regulator means includes an oscillator connected to said motor means to cause hunting thereby.

30. The apparatus of claim 24 wherein said transducer includes:
   fluid dampening means connected serially between the line to be regulated and said transducer.

31. A back pressure regulator system, comprising:
   (a) a pressure transducer including dampening means exposed to a pressure in a line to be regulated, said transducer forming an output signal representing the pressure to be regulated; wherein said dampening means smooths output signal variations;
   (b) needle valve means having a resilient valve seat, a needle valve extending into said valve seat, and a stem supporting said needle valve to enable opening from a closed position;
   (c) a motor connected to said stem to move said stem;
   (d) regulator means connected to said transducer output signal for forming a motor driving signal to adjust the position of said needle valve in said valve seat and wherein adjustment includes opening and closing with oscillatory motion at said stem to clear bubbles from said valve seat; and
   (e) passage means connecting with the pressure in a line to be regulated and inputting such pressure to said needle valve for regulated flow therethrough wherein said pressure upstream in the line from said needle valve means is controlled by movement of said needle valve.

32. The apparatus of claim 31 wherein said regulator means includes an oscillator connected to said motor means to cause hunting thereby and dampening means to limit motor response.

* * * * *